(12) United States Patent
Hoepner et al.

(10) Patent No.: US 11,851,228 B2
(45) Date of Patent: Dec. 26, 2023

(54) SEALING DEVICE FOR SEALING PACKAGES

(71) Applicant: MULTIVAC SEPP HAGGENMUELLER SE & CO. KG, Wolfertschwenden (DE)

(72) Inventors: Bernd Hoepner, Kempten (DE); Peter Buchberger, Waltenhofen (DE); Patrick Jung, Kempten (DE); Albert Gabler, Lachen-Albishofen (DE)

(73) Assignee: MULTIVAC SEPP HAGGENMUELLER SE & CO. KG, Wolfertschwenden (DE)

( * ) Notice: Subject to any disclaimer, the term of this patent is extended or adjusted under 35 U.S.C. 154(b) by 0 days.

(21) Appl. No.: 17/579,931

(22) Filed: Jan. 20, 2022

(65) Prior Publication Data
US 2022/0227518 A1 Jul. 21, 2022

(30) Foreign Application Priority Data
Jan. 20, 2021 (DE) .......................... 102021101092.6

(51) Int. Cl.
*B65B 43/52* (2006.01)
*B65B 57/08* (2006.01)
*B65B 51/10* (2006.01)

(52) U.S. Cl.
CPC .............. *B65B 57/08* (2013.01); *B65B 43/52* (2013.01); *B65B 51/10* (2013.01)

(58) Field of Classification Search
USPC .......................................................... 53/552
See application file for complete search history.

(56) References Cited

U.S. PATENT DOCUMENTS

| 8,485,341 B2 | 7/2013 | Woerz |
| 10,207,876 B2 | 2/2019 | Ickert |

(Continued)

FOREIGN PATENT DOCUMENTS

| DE | 10 2006 030 433 A1 | 11/2007 |
| DE | 10 2008 008 678 A1 | 8/2009 |

(Continued)

OTHER PUBLICATIONS

European Search Report (with English Machine Translation) dated Jun. 15, 2022, Application No. 22150017.6-1014, Applicant Multivac Sepp Haggenmueller SE & Co. KG, 12 Pages.

(Continued)

*Primary Examiner* — Chinyere J Rushing-Tucker
(74) *Attorney, Agent, or Firm* — BROOKS KUSHMAN P.C.

(57) ABSTRACT

Sealing device for sealing packages, the sealing device comprising a sealing station with a plurality of receptacles for packages, a transfer belt arranged upstream of the sealing station for transferring packages to the sealing station, a transport belt arranged upstream of the transfer belt for transporting and transferring packages to the transfer belt, and a feeding device for feeding packages to the transport belt, wherein the transport belt and the transfer belt can be driven independently of one another, and wherein the sealing device comprises at least one sensor, which is adapted to determine a distance between successively transported packages in the feeding device, and a control unit, wherein the control unit is adapted to determine a speed profile of the transport belt and a speed profile of the transfer belt based on a distance of successively transported packages measured by the sensor, and to control the transport belt and the transfer belt as a function of the speed profile so that the distance of successive packages during a transfer to the (Continued)

sealing station corresponds to the distance of adjacent receptacles for packages.

19 Claims, 2 Drawing Sheets

(56) References Cited

U.S. PATENT DOCUMENTS

| | | | | |
|---|---|---|---|---|
| 2010/0101919 A1* | 4/2010 | Itoh | ................... | B65G 47/31 |
| | | | | 198/459.8 |
| 2011/0005171 A1* | 1/2011 | Woerz | ................ | B65G 47/268 |
| | | | | 53/448 |
| 2017/0267463 A1* | 9/2017 | Ickert | .................. | B65B 7/164 |

FOREIGN PATENT DOCUMENTS

| | | |
|---|---|---|
| DE | 10 2008 048 831 A1 | 4/2010 |
| DE | 10 2009 031 516 A1 | 1/2011 |
| DE | 10 2016 204 193 A1 | 9/2017 |
| EP | 0 680 880 B1 | 11/1998 |
| WO | 2011/041320 A2 | 4/2011 |

OTHER PUBLICATIONS

German Search Report Application No. 10 2021 101 092.6 dated Sep. 10, 2021, Letter identifiers that indicate relevance of the cited documents (see p. 2 of the German Search Report).
DE 10 2006 030 433 A1, Abstract & Machine Translation.
DE 10 2008 008 678 A1, Abstract & Machine Translation.
DE 10 2008 048 831 A1, Abstract & Machine Translation.
DE 10 2016 204 193 A1, U.S. Pat. No. 10,207,876 B2.
German Search Report dated Sep. 10, 2021, Application No. 10 2021 101 092.6, Applicant Multivac Sepp Haggenmueller SE & Co. KG, 6 Pages.
European Search Report Application No. 22150017.6-1014 dated Jun. 15, 2022, English Machine Translation.
DE 10 2009 031 516 A1, U.S. Pat. No. 8,485,341 B2.

* cited by examiner

SEALING DEVICE FOR SEALING PACKAGES

This application claims foreign priority benefits under 35 U.S.C. § 119(a)-(d) to German patent application number DE 10 2021 101 092.6, filed Jan. 20, 2021, which is incorporated by reference in its entirety.

TECHNICAL FIELD

The present disclosure relates to a sealing device for sealing packages, and to a method for controlling the transport of packages in a sealing device.

BACKGROUND

Sealing devices are known from the prior art. These can be used, for example, to seal packaging trays (also known as trays) with product placed in them, such as slices of sausage or cheese, with a film. For this purpose, the film is positioned in the receptacles of a sealing station (also known as a tray sealer) of the sealing device above the filled packaging trays and is bonded to the packaging trays, for example by the action of heat, so that the packaging thus produced is sealed gas-tight if necessary.

The sealing device usually also comprises one or more transport devices which feed the filled packages to the sealing station. The transport devices can be adapted in particular as conveyor belts.

EP 0 680 880 B1 describes a sealing device in which the packages arrive at an irregular distance on a conveyor belt and are fed from there to the sealing station. In order to ensure that the packages are transferred to the sealing station at the distance required for the molds, a buffer conveyor, which can be driven independently of the conveyor belt, is provided between the sealing station and the conveyor belt. The speed of the buffer conveyor is controlled such that possible varying distances of the molds in the conveyor belt are compensated for when the packages are transferred to the buffer station.

However, the buffer conveyor can only be accelerated and decelerated to a limited extent without jeopardizing the correct alignment of the molds on the buffer conveyor. In addition, the adjustment of the speed of the buffer conveyor and the limited possibility of acceleration requires a certain amount of time to achieve the necessary speed to compensate for varying distances between the packages in the conveyor belt. In the case of larger gaps between the packages in the conveyor belt, this can lead to the fact that the operation of the buffer conveyor can either not be ensured in a process-stable manner, or some sealing stations cannot be filled.

SUMMARY

Based on the known prior art, the technical problem to be solved is thus to provide a sealing device and a method for controlling the transport of packages in a sealing device, with which reliable operation of the sealing device can be ensured even in the case of large gaps between packages in the infeed to the sealing station.

The sealing device for sealing packages according to the disclosure comprises a sealing station with a plurality of receptacles for packages, a transfer belt arranged upstream of the sealing station in a production direction of the sealing device for transferring packages to the sealing station, a transport belt arranged upstream of the transfer belt for transporting and transferring packages to the transfer belt, and a feeding device for feeding packages to the transport belt, wherein the transport belt and the transfer belt are drivable independently of one another and wherein the sealing device comprises at least one sensor adapted to determine a distance of successively transported packages in the feeding device, and a control unit, wherein the control unit is adapted to determine a speed profile of the transport belt and a speed profile of the transfer belt based on a distance of successively transported packages measured by the sensor, and to control the transport belt and the transfer belt as a function of the speed profile, so that the distance between successive packages during a transfer to the sealing station corresponds to the distance between adjacent receptacles for packages.

The fact that the transfer belt and the transport belt can be driven independently of one another is to be understood here in particular such that the speed and/or acceleration of the transfer belt can differ from that of the transport belt and these can also be varied independently of one another. In particular, the transfer belt and the transport belt can also be driven independently of the feed belt.

A speed profile (for both the transfer belt and the transport belt) can be determined as a difference profile of the speed of the respective belt from a normal operation at constant speed. Alternatively, the speed profile can indicate or characterize the actual movement of the respective belt as a function of time. In principle, the speed profile can thus be a function of speed as a function of time, such as v(t). It is also possible that the speed profile specifies or comprises only or also a function for the acceleration acting on the respective belt as a function of time, for example a(t). Alternatively or additionally, a travel distance of the belt depending on time, for instance as s(t), can also be regarded as a speed profile. Furthermore, the speed profile does not have to specify the complete functions v(t), a(t) or s(t). It may also be provided that instead of the function or functions, the speed profile specifies parameter values that can be used to determine the functions, such as a constant acceleration or the like.

The fact that the control unit determines the speed profiles means here that, depending on the measured distance between the packages, the control unit determines how the transfer belt and/or the transport belt must be moved in order to cause the distance between the packages in the transfer belt or at least when transferred to the sealing station to correspond to the distance between the receptacles.

In this context, the packages can be transferred to the sealing station, for example, with the aid of a recipient who removes a number of packages, which can correspond to the number of receptacles of the sealing station, from the transfer belt (or a transport belt downstream of the transfer belt) and feeds them to the sealing station. For this purpose, the packages do not necessarily have to be stationary, but can also be removed by the recipient during a movement in the transfer belt or a downstream transport belt.

By detecting the distances between the packages already upstream of the transport belt and driving the transport belt and the transfer belt independently of the feed belt, this sealing device allows compensation of even larger gaps in the flow of packages, so that particularly process-stable operation of the sealing device is possible.

It can be provided that the sealing device comprises a second sensor, which is adapted to determine a distance of successively transported packages in the transport belt, wherein the control unit is adapted to determine a speed profile of the transfer belt depending on the distance measured by the sensor and on the distance measured by the second sensor and to control the transfer belt as a function of the speed profile.

The use of the second sensor together with the sensor located in the area of the feeding device allows various possibilities for adapting the speed profiles of the transfer belt and the transport belt. It is thus possible to provide for an adjustment of the speed profile of the transport belt only if, for example, an adjustment of the speed profile of the transfer belt is not sufficient to compensate for a resulting gap in the feeding device. The effort required in terms of control technology can thus be reduced.

In one embodiment, it is provided that the control unit is adapted to determine, depending on the distance of successively transported packages in the feeding device measured by the sensor, whether a speed profile determined for the transfer belt exceeds a threshold value for the movement of the transfer belt at constant speed of the transport belt.

A threshold value for the movement of the transfer belt can, for example, be a maximum acceleration or deceleration at which reliable transport of the packages on the transfer belt is still possible without affecting their relative arrangement on the transfer belt. In this way, reliable transport and transfer of the packages to the sealing station can be ensured even in the event of major changes in the distances between the packages in the feeding device.

In particular, the control unit can be adapted to determine the speed profiles of the transport belt and the transfer belt as a function of the distance of successively transported packages in the feeding device measured by the sensor such that the threshold value of the movement of the transfer belt is not exceeded.

If, for example, it is determined that a change in the speed profile of only the transfer belt is not sufficient or cannot be carried out in such a way that the threshold value is not exceeded, the speed profile of the transport belt can also be changed. In this way, part of the necessary adjustment to the changing distance between the packages in the feeding device can already be compensated for before the packages are then fed to the transfer belt. The transfer belt must then compensate for any remaining deviation in the distance between the packages in the transport belt, which can be achieved by adjusting a speed profile of the transfer belt while maintaining the threshold value. Thus, a reliable transport of the packages to the sealing station can be ensured overall.

In this context, it can be provided that the threshold value specifies a maximum deceleration and/or a maximum acceleration of the transfer belt. Acceleration and deceleration can also be generally combined under the term "acceleration", wherein the sign of the corresponding numerical value then indicates whether it is an acceleration (positive sign) or a deceleration (negative sign). Both strong accelerations and strong decelerations can cause the packages to slip on the transfer belt, which can ultimately lead to a change in their relative distance. If the maximum acceleration or the maximum deceleration is not exceeded, this effect can either be kept very small or not occur at all (for example, because there is no transition of the packages from static friction on the transfer belt to sliding friction). This ensures reliable transport of the packages at the required distance.

In particular, the speed profile of the transport belt and/or the speed profile of the transfer belt may comprise one or more parameters concerning an acceleration, a deceleration, an acceleration duration, a deceleration duration, a transport speed, a duration for which the transport speed is maintained.

In one embodiment, the control unit is adapted to control the movement of the transfer belt and the transport belt based on the speed profiles so that the transport belt and the transfer belt move at the same speed, at least when a package is transferred from the transport belt to the transfer belt. In this way, low forces are preferably exerted on the packages during transfer so that they do not slip unintentionally. This ensures safe transport of the packages.

Furthermore, the sensor and/or the second sensor can be or comprise a light barrier. Light barriers, for example in conjunction with a time measuring device such as a clock or a counter, allow reliable distance determination even without precise knowledge of the shape and/or form of the packaging, if the movement characteristics of the feed belt (or the feeding device) are known so that the sealing device can also be used for different packaging forms.

According to the disclosure, a method for controlling the transport of packages in a sealing device is further provided, wherein the sealing device comprises a sealing station with a plurality of receptacles for packages, a transfer belt arranged upstream of the sealing station, which transfers packages to the sealing station, a transport belt arranged upstream of the transfer belt, which transports packages and transfers them to the transfer belt, and a feeding device, which feeds packages to the transport belt, wherein the transport belt and the transfer belt can be driven independently of one another and wherein the sealing device comprises at least one sensor, which determines a distance between successively transported packages in the feeding device, and a control unit, wherein the method comprises that the control unit determines a speed profile of the transport belt and a speed profile of the transfer belt based on a distance of successively transported packages measured by the sensor and controls the transport belt and the transfer belt as a function of the speed profile such that the distance of successively transported packages during a transfer to the sealing station corresponds to the distance of adjacent receptacles for packages.

With this method, reliable transport of packages at the required distance from the sealing station can be ensured, even if there are considerable fluctuations in the distance between successive packages upstream of the sealing station.

It can be provided that the sealing device comprises a second sensor that determines a distance of successively transported packages in the transport belt, wherein the control unit determines a speed profile of the transfer belt depending on the distance measured by the sensor and on the distance measured by the second sensor and controls the transfer belt as a function of the speed profile. With this embodiment, for example, control of only the transfer belt can be effected if the distances of the packages in the feeding device vary comparatively little. The adjustment of the speed profile can then be based, for example, on the measured distances on the transport belt if the distance determined in the feeding device is below a limit value which, if exceeded, would also require an adjustment of the speed profile of the transport belt.

Here, it can be provided in particular that the control unit determines, depending on the distance of successively transported packages in the feeding device measured by the sensor, whether a speed profile determined for the transfer belt exceeds a threshold value for the movement of the transfer belt at constant speed of the transport belt. This verification allows to determine whether the adjustment of the speed profile of the transfer belt alone is sufficient or whether the speed profile of the transport belt must also be changed to compensate for a changing distance of the packages in the feeding device.

In one embodiment, the control unit determines the speed profiles of the transport belt and the transfer belt as a function of the distance of successively transported packages in the feeding device measured by the sensor such that the threshold value of the movement of the transfer belt is not exceeded. Thus, a reliable transport of the packages on the transfer belt is realized.

In this context, the threshold value can indicate a maximum deceleration and/or a maximum acceleration of the transfer belt. Since accelerations and/or decelerations can have an influence on the relative position of packages on the transfer belt, taking into account the maximum permissible deceleration or acceleration can ensure that no or only minor undesirable changes occur in the distances between the packages within the transport belt.

In one embodiment, it is further provided that the speed profile of the transport belt and/or the speed profile of the transfer belt comprises one or more parameters concerning an acceleration, a deceleration, an acceleration duration, a deceleration duration, a transport speed, a duration for which the transport speed is maintained.

It can also be provided that the control unit controls the movement of the transfer belt and the transport belt based on the speed profiles such that the transport belt and the transfer belt move at the same speed, at least when a package is transferred from the transport belt to the transfer belt. With this embodiment, the forces acting on the packages during transfer from the transport belt to the transfer belt can be advantageously reduced.

DETAILED DESCRIPTION

Figure 1:
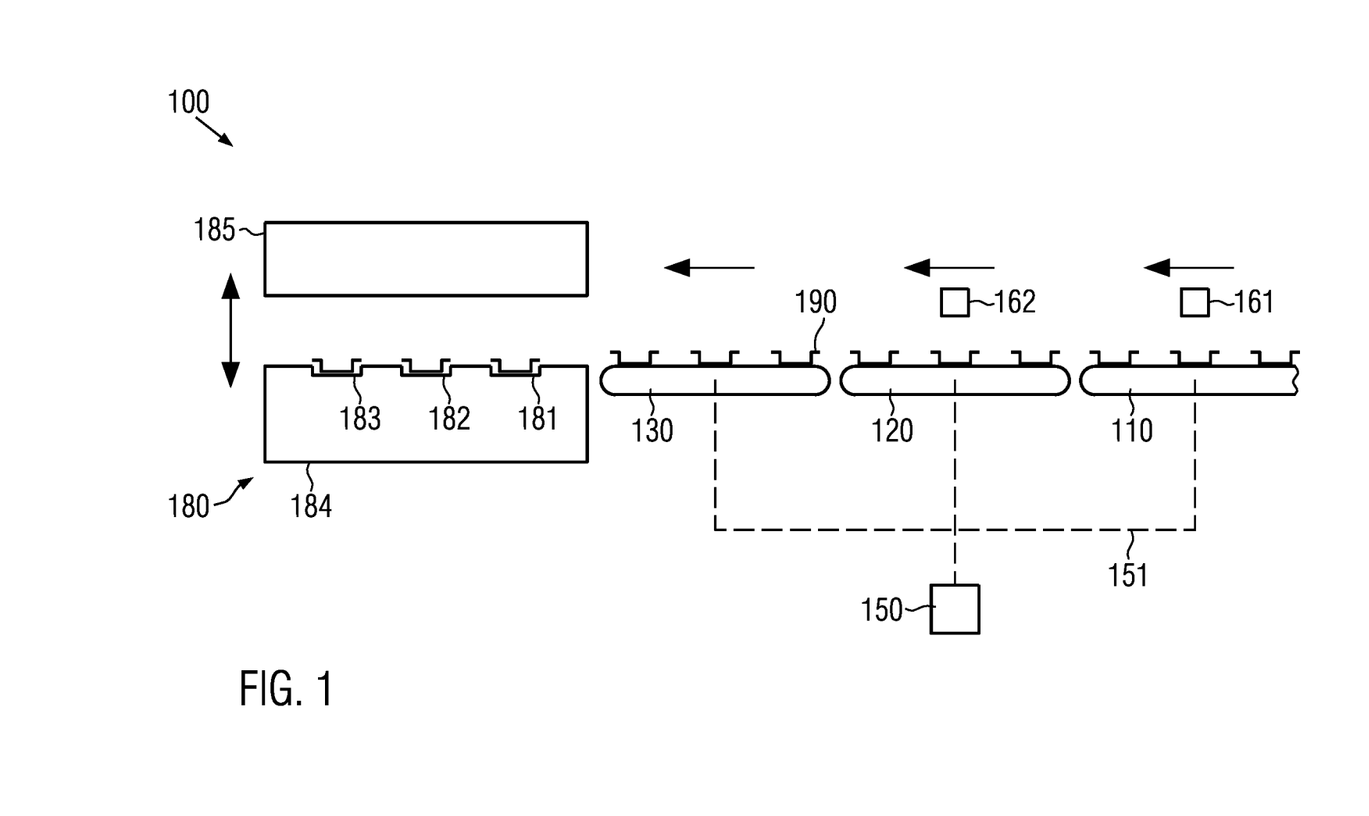
FIG. 1 shows a sealing device according to one embodiment.

FIG. 1 shows a schematic side view of a sealing device 100 according to one embodiment. In the embodiment shown here, the sealing device 100 comprises a sealing station 180. This sealing station 180 usually comprises two elements movable relative to one another, wherein a first element 184 comprises a series of receptacles 181-183. The packages 190 shown here can be inserted into these receptacles 181-183 and then sealed, for example by applying a film, in interaction with the second element 185, which can be moved towards the receptacles 181-183 or the first element 184. The operation of the sealing station 180 is basically known and will not be further explained in detail here.

In the transport direction of the packages 190 through the sealing device 100 upstream of the sealing station 180, further devices 110-130 are shown. The transport direction is the direction in which the packages 190 are transported through the sealing device 100. The transport direction is shown above the devices 110-130 with arrows.

According to one embodiment, the devices 110-130 are transport belts which can preferably all be driven independently of one another. This means that the transport belt 110 can be driven at a speed and/or acceleration that is different from the speeds and/or accelerations of the belts 120, 130. The same applies to the other belts 120, 130, so that in principle it is possible to drive the belts 110-130 such that their speeds and/or accelerations are different in pairs.

The belts 110-130 are designated differently in the following to enable better differentiation. The belt 110 will also be referred to as the feeding device 110. The device 120 will be referred to in the following as transport belt 120 and the device 130 as transfer belt 130.

The feeding device 110 is arranged such that it can feed packages 190 to the transport belt 120. For this purpose, the feeding device 110 can be adapted as an endless conveyor on which the packages 190 do not necessarily have to arrive in an orderly manner (in particular with regard to their distance), so that they can also be transported in this device at variable distances from one another. This means that two successive packages 190 in the feeding device 110 do not necessarily always have the same distance.

The transport belt 120 is preferably adapted to receive the packages 190 also at different distances from each other. The transfer belt 130 is adapted and arranged such that it can take over packages 190 from the transport belt 120 and feed them in a suitable manner to the sealing station 180.

For this purpose, it is provided in particular that the packages 190 can be brought to a distance on the transfer belt 130 which corresponds to the distance of the receptacles 181-183 in the sealing station 180. It can be provided that the packages 190 are not transferred directly from the transfer belt 130 to the sealing station 180, but are taken from the transfer belt, lifted if necessary, and introduced into the receptacles 181-183, for example by a carrier (not shown here). For this purpose, the carrier can comprise a number of gripping elements which can grip the packages 190 and deposit them in the receptacles 181-183.

Alternatively, it can also be provided that a further transport belt (not shown here) is arranged between the transfer belt 130 and the sealing station 180, which transports the packages 190 at constant speed and optionally stops cyclically, so that a carrier can take over the packages 190 from this transport belt and feed them to the receptacles 181-183. By cyclic movement of this additional transport belt, it can be achieved that the packages 190 do not have to be taken over by the carrier during a movement, which might be more difficult to realize in terms of control.

Furthermore, a control unit 150 is shown in FIG. 1. This control unit 150 can be adapted, for example, as a control computer, which has suitable programs and/or hardware adapted for controlling the movement of the devices 110-130. For this purpose, the control unit 150 may be connected to each of the devices 110-130 via means for data transmission 151. These means 151 can be adapted as data cables, for example, but can also implement a wireless connection, for example via WAN, W-LAN or Bluetooth.

In particular, it is provided that the control unit 150 can determine a speed profile at least for the transport belt 120 and the transfer belt 130 and can control the movement of the transport belt 120 and/or the transfer belt 130 as a function of this speed profile. For this purpose, the control unit 150 can be connected, for example, to a drive device of the transport belt 120 and/or the transfer belt 130 for the purpose of control. In particular, means for data transmission, such as LAN connections or wireless connections via Bluetooth or W-LAN, may also be provided for this purpose. The control unit 150 can thus, for example, control a current or the like supplied to a servomotor in order to convert the speed profiles of the transport belt 120 and the transfer belt 130 into a movement of the transport belt and the transfer belt.

The speed profiles are characteristic for a movement to be executed by the transport belt 120 and/or transfer belt 130. In particular, they can characterize a speed and/or an acceleration and/or a distance to be covered by a point of the transport belt 120. For this purpose, the speed profiles can be determined by the control unit 150, for example, in the form of a mathematical function that specifies the travel distance s(t) of the respective belt as a function of time. Alternatively or additionally, the speed as a function of time, for example in the form of a function v(t), or an acceleration, for example in the form of a function a(t), can also be determined by the control unit 150 and, depending on this, control signals for drive devices of the belts 120, 130 can be derived. However, the representation or obtaining of functions is not mandatory. Another realization of signals for controlling the movement of the belts 120, 130 is also conceivable.

However, if corresponding, time-dependent functions are determined within the scope of the speed profiles, these can also refer only to a specific time interval and do not have to provide a continuous (in the sense of a gapless) representation of the movement of the transport belts over time. For example, it can be provided that the speed profiles are determined only as difference profiles to an otherwise preset speed profile of the transport belt 120 and the transfer belt 130. For example, if a change in acceleration and/or a change in speed of the transfer belt 130 is required for a period of five seconds, the control unit 150 may determine a speed profile for the transfer belt 130 that is applied to the transfer belt 130 only during those five seconds and then return to an approximately preset movement of the transfer belt. However, the disclosure is not limited in this respect.

Furthermore, at least one (first) sensor 161 is provided in the area of the feeding device 110. This sensor 161 is arranged and adapted to determine the distance between successively transported packages 190 in the feeding device 110. The distance determined in this way or a signal indicative of this distance (for example a signal indicating that no packaging is detected in the area of the sensor 161) can then be transmitted to the control unit 150 via suitable means for data transmission.

Preferably, the sensor 161 is arranged in the area of the feeding device 110 upstream of the transport direction of the packages 190 as far as possible from a transfer point at which the packages are transferred to the transport belt 120.

Since the distance of successively transported packages 190 in the feeding device 110 may change, the distance of successive packages as determined by the first sensor 161 may be used by the control unit 150 to determine whether a change in the speed profile of the transfer belt 130 and/or the transport belt 120 is necessary to ensure that the distance of the packages as they are transferred from the transfer belt 130 to the sealing station 180 corresponds to the distance of the receptacles 181-183.

As will be described further on with reference to FIG. 2, the control unit 150 is preferably adapted such that it can control the speed profiles of the transport belt 120 and/or of the transfer belt 130 in such a way that threshold values, for example, for the acceleration and/or the speed of these belts are not exceeded. The threshold values can be values that indicate up to which amount or value an acceleration (including an increase in speed or a reduction in speed as part of a deceleration) can be effected, if necessary, over which maximum time period, without packages already transported by the transport belt 120 and/or the transfer belt 130 slipping during this acceleration.

The threshold values can be determined, for example, as a function of a static friction coefficient and/or a sliding friction coefficient of the respective packaging material with respect to the material of the part of the transport belt 120 and/or the transfer belt 130 that comes into contact with the packages 190. It can be provided that the threshold values are selected such that, when an acceleration below the threshold value is experienced, the packages 190 do not change from their static friction on the respective belt to sliding friction. This prevents the packages 190 from slipping relative to the respective belt.

Preferably, it may be provided that the control unit 150, depending on the distance between successive packages 190 measured by the first sensor 161, first determines whether a change in the speed profile of the transfer belt 130 alone is sufficient to adjust the distance between packages to correspond to the distance between the receptacles 181-183 in the sealing station 180 and, when this adjustment is made, there is no acceleration or deceleration of the transfer belt that exceeds the threshold value. If it is determined that the threshold value would be exceeded if an adjustment of the distance of successive packages 190 were effected solely by changing the movement of the transfer belt 130, it can be provided that the control unit 150 then also makes a change in the speed profile of the transport belt 120 or determines a speed profile for the transport belt 120, with which the transport belt is then controlled, so that part of the necessary change in the distance of successive packages is already carried out by the transport belt.

Thus, the determination of the speed profiles of the transport belt 120 and the transfer belt 130 can be adapted such that a threshold value is not exceeded for any of the transport belts.

In addition, a second sensor 162 can be provided in the area of the transport belt 120. This is preferably arranged and adapted such that it can determine the distance of successively transported packages 190 on the transport belt 120. The control unit 150 may then be additionally adapted to also use the distance of subsequent packages 190 in the transport belt 120, as determined by this second sensor 162, to determine and/or control the speed profile of the transfer belt 130.

In particular, it can be provided that if it is determined on the basis of the distance measured by the first sensor 161 that a threshold value for the acceleration of the transfer belt 130 is not exceeded, the control unit 150 initially does not carry out any further control or determination of speed profiles for both the transport belt 120 and the transfer belt. Only when the second sensor 162 indicates that the distance of subsequent packages 190 in the transport belt 120 requires a modification of the speed profile of the transfer belt 130, the control unit 150 can then determine a corresponding speed profile for the transfer belt and control it accordingly.

Figure 2:
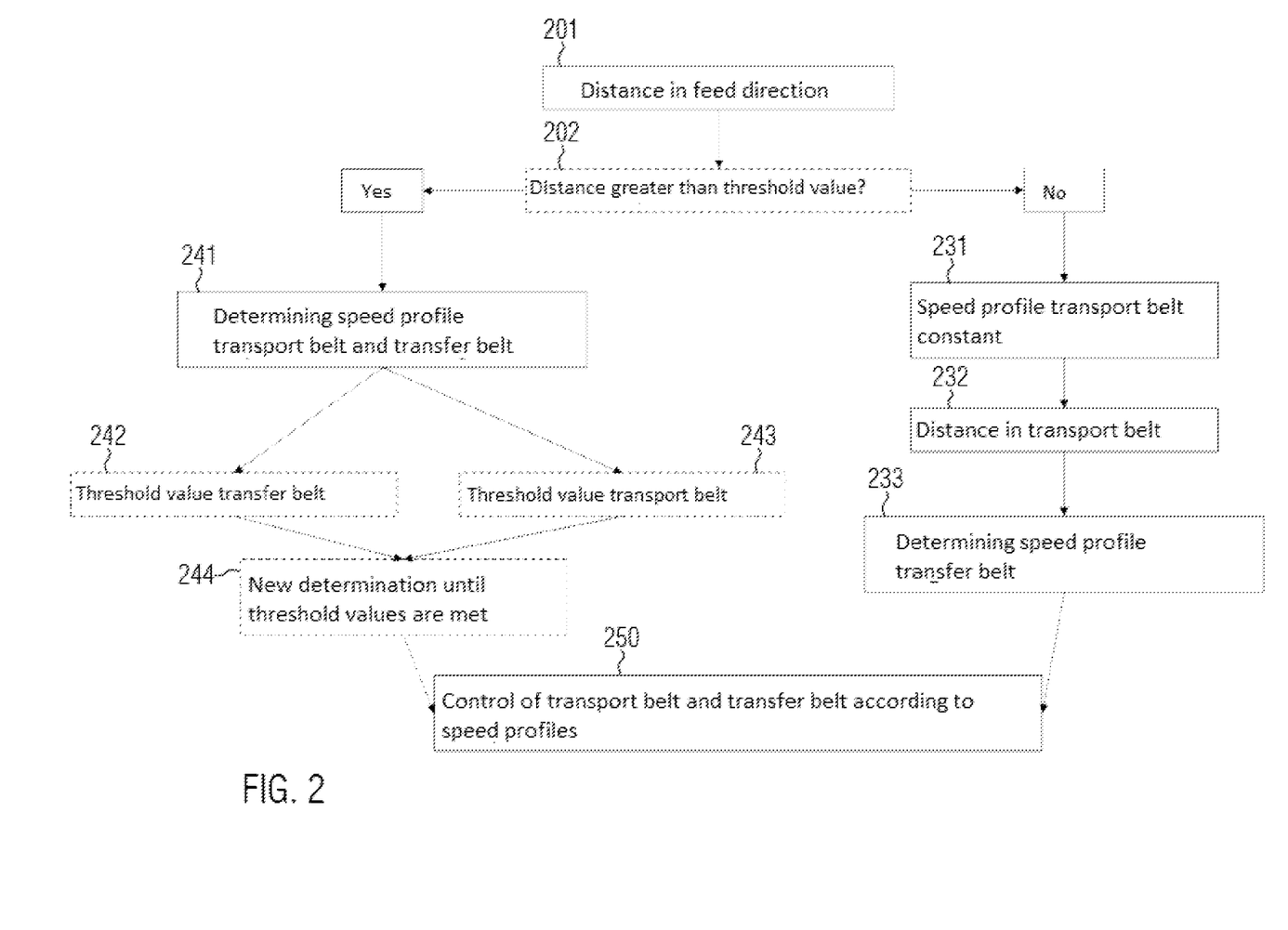
FIG. 2 shows a flow diagram for determining speed profiles and corresponding control of the transport belt and/or the transfer belt according to one embodiment.

For this purpose, FIG. 2 shows a flow diagram corresponding to an embodiment for the control of the transfer belt 130 and/or the transport belt 120 by the control unit 150.

In FIG. 2, the method illustrated begins with step 201 by determining a distance between successive packages 190 in the feeding device 110 (such as by means of the sensor 161). Preferably, this determination takes place for each pair of successive packages 190 so that for each pair of successive packages it can be checked whether their distance corresponds to the distance of the receptacles 181-183 in the sealing station 180.

In the next step 202, the control unit 150 then checks, based on the measured distance, whether this distance or a correction of this distance would require an acceleration and/or speed of the transfer belt 130 or the transport belt 120 that is greater than a threshold value that applies to the possible speed profiles of the transfer belt and/or the transport belt.

For this purpose, for example, the correction of the distance to be made can be determined. If, for example, the distance between successive packages 190 is 20 cm, however, the distance between the receptacles 181-183 is 10 cm, the distance between the packages must be reduced by 10 cm by suitable control of the movement of the transfer belt 130 and/or the transport belt 120. Based on the knowledge of the other operating parameters (such as the speed of the transfer belt 130 and the transport belt 120), it is possible to derive any accelerations or decelerations necessary to effect such a change in distance. These can then be compared with a threshold value in order to check in step 202 whether at least one threshold value is exceeded.

Alternatively, it can also be provided that it can be determined directly from the measurement of the distance whether a correction of the distance merely by changing the movement of the transport belt 120 or the transfer belt 130 exceeds a threshold value. Instead of first determining from the measured distances whether the necessary acceleration or deceleration exceeds a threshold value at the known speeds of the transport belt 120 and transfer belt 130, the distance of the packages 190 in the feeding device 110 associated with this threshold value can also be used as a limit distance, since exceeding it (for accelerations) or falling below it (for decelerations) is already indicative of the corresponding exceeding or falling below the threshold values for the movement of the transfer belt 130 or transport belt 120.

This step 202 may be optional and need not be performed. If it is not performed, the method always follows the further method as it would be performed if it is determined in step 202 that the distance is so large that at least one threshold value for the movement of the transport belt 120 and/or the transfer belt 130 would be exceeded.

First, it is assumed that in step 202, it is determined that the distance between successive packages 190 in the feeding device 110 is not so great (or so small) that a threshold value for a speed profile of the transfer belt 130 is exceeded.

Based on this determination, it can then be recognized by the control unit 150 in step 231 that the speed of the transport belt 120 does not need to be changed for the purpose of adjusting the distance of these subsequent packages 190.

In step 232, the distance between these successive packages 190 after their transfer to the transport belt 120 can then optionally be determined on the transport belt (for example, using the second sensor 162).

Either based on the distance of successive packages 190 in the feeding device 110 measured in step 201 or the distance of the successive packages on the transport belt 120 optionally measured in step 232, the speed profile of the transfer belt 130 can then be determined in step 233 such that the distance of successive packages is adjusted such that once the successive packages have both been transferred from the transfer belt, they have a distance that corresponds to the distance of the receptacles 181-183 in the sealing station 180.

For this purpose, the speed profile of the transfer belt 130 is then determined such that it initially continues to travel at non-reduced speed, for example, and takes over the leading packaging of the two subsequent packages 190. The speed profile further comprises an acceleration interval in which the speed of the transfer belt 130 is increased or decreased. Furthermore, the speed profile can include a time interval in which the transfer belt 130 is moved at the increased or decreased speed. This can be followed by a second acceleration interval to bring the speed of the transfer belt back 130 to the original speed. These intervals, as well as the accelerations and the increased or decreased speed can be represented as follows.

First, the total time T available for correcting the distance between successive packages 190 is given by the time that elapses between the transfer of the leading package to the transfer belt 130 and the transfer of the trailing package of the pair of successive packages to the transfer belt. If the packages move in the transport belt 120 at the speed V, then this time T is given by $$T = \frac{S}{V},$$

by wherein S is the distance of the packages 190 in the transport belt or the feeding device 110, or the distance determined by the sensors 161 and 162.

The time interval available for the first acceleration interval and the second acceleration interval can be chosen to be the same size in each case, for example $t_1$. For the time interval that lies between these intervals for the movement with the constant speed k, the time interval $t_2=T-2t_1$ is then obtained. The acceleration $a_1$ in the first acceleration interval can preferably be selected equal to the acceleration $a_2$ in the second acceleration interval, only with opposite sign so that generally the acceleration is designated as a.

For the speed k in the interval $t_2$ it is then true that $k=V+at_1$, provided, as is assumed here, that the acceleration in the time interval $t_1$ is constant in time.

Thus, the parameters characterizing the speed of the transfer belt 130 that can still be adjusted to cause a change in distance are the acceleration a and the time interval $t_1$.

In order to determine this and thus the speed profile of the transfer belt 130, the control unit 150 can now use a target distance D, which can be approximately equal to the distance between the receptacles 181-183 of the sealing station 180. Irrespective of the movement of the subsequent package, a movement of the transfer belt 130 by the distance D in the time interval T after the leading package has been taken over ensures that the distance of the subsequent package then taken over by the transfer belt to the leading package is equal to D.

Thus, it must be valid that $$D = Vt_1 + \frac{a}{2}t_1^2 + (V+at_1)(T-2t_1) + (V+at_1)t_1 - \frac{a}{2}t_1^2$$

The first summand $$Vt_1 + \frac{a}{2}t_1^2$$

describes the distance traveled during the first acceleration interval. The second summand $(V+at_1)(T-2t_1)$ describes the movement with constant speed in the time interval t2 and the third summand $$(V+at_1)t_1 - \frac{a}{2}t_1^2$$

describes the movement in the second acceleration interval. As can be seen, this equation is independent of $$\frac{a}{2}t_1^2,$$

since deceleration and acceleration cancel each other out here. From this, it results that $$D = V\,t_1 + (V+at_1)(T-2t_1) + (V+at_1)t_1$$

From this, a condition for a and $t_1$ can be derived, which can be represented as $$t_1 = \pm\sqrt{\frac{VT-D}{a}}$$

Thus, in principle, the time interval $t_1$ and the acceleration a could always be selected so that a threshold value for the acceleration a is never exceeded. However, it must also apply that $$\frac{T}{2} \geq t_1,$$

since only the time T is available for the entire process. For the limiting case that $$\frac{T}{2} = t_1,$$

a limit value for the acceleration a can thus be determined, which is $$a = a_{limit\ value} = 4\frac{VT-D}{T^2}$$

This value would have to be chosen for the acceleration if the transfer belt 130 in the time interval T does not have an interval of constant speed between the two acceleration intervals. For this case, the speed profile is thus completely determined so that the time interval $t_1$ for the acceleration and the deceleration, as well as the acceleration a are known. If it is provided that the transfer belt 130 moves with constant speed between the acceleration intervals, the above equation may require corrections. Here, for example, further boundary conditions, such as division of the time interval T into three equally large time intervals, can be used to restrict the parameter range for a and $t_1$ so that these variables can be determined and thus the speed profile specified.

This enables the transfer belt 130 to be controlled in the time interval T so that, after the leading package and the trailing package have been taken over, they are at a distance of D from each other corresponding to the distance in the receptacles 181-183.

The above explanations are only exemplary. It is also possible to determine the acceleration and/or speed differently in order to set the distance.

Based on the derived or determined speed profile, the transfer belt 130 can then be controlled in step 250 according to the speed profile as soon as the leading package is transferred to the transfer belt. Preferably, the transfer of each package to the transfer belt 130 is done such (as already assumed in the above calculation) that the speed of the transfer belt and the transport belt 120 are the same during the transfer. This avoids undesirable forces acting on the packages 190.

Steps 231 to 233 are described here as keeping the speed profile of the transport belt 120 constant. This does not necessarily mean that the transport belt 120 is also operated at a constant speed. It merely means that no change in the speed profile of the transport belt 120 occurs due to the distance between subsequent packages 190 measured in the feeding device 110. Any cycles of acceleration and deceleration of the transport belt 120 can still be carried out.

Preferably, however, the transport belt 120 can be moved at a constant speed, provided that no change in its speed profile is necessary. This can, however need not, also apply to the transfer belt 130.

If it is determined in step 202 that the distance between successive packages 190 in the feeding device 110 exceeds (or falls below) a limit distance which is indicative, for example, that a threshold value of a parameter of the movement of the transfer belt 130 would also have to be exceeded in order to compensate the distance between successive packages of the feeding device with this distance, this is determined in step 202 (characterized as "yes").

Based on this determination, the control unit 150 can determine the speed profiles of the transport belt 120 and the transfer belt 130 in step 241 such that the distance of the successive packages 190 is changed such that it corresponds to the distance of the receptacles 181-183 in the sealing station 180 without exceeding a threshold value for the movement profiles of the transport belt 120 and the transfer belt 130. This can be done analogously to step 233, wherein it can be provided, for example, that half each of the necessary correction of the distance is compensated by a control of the speed profile of the transport belt 120 and by a control of the speed profile of the transfer belt 130. This can reduce the necessary accelerations and/or decelerations for the transport belt 120 and the transfer belt 130.

Alternatively, it can also be provided that the control unit 150 tries, for example iteratively, to adjust the speed profile of the transfer belt 130 precisely so that the threshold value is not exceeded and any correction of the distance between the successive packages 190 that is then still necessary is then carried out by changing the speed profile of the transport belt 120.

Alternatively, it is also possible to provide for a change in the speed profile of the transport belt 120 up to the threshold value. The greater the accelerations and/or decelerations acting on the packages 190, the more likely it is that the packages will slip. Therefore, if a deceleration and/or acceleration already approaching the threshold value is used on the transport belt 120 to change the distance of successive packages 190, the resulting distance of the packages and, for example, also a changed distance of packages already on the transport belt 120 can be determined with the aid of the second sensor (see the second sensor 162 in FIG. 1), for example, and a correction of the speed profile of the transfer belt 130 can then be made, wherein this correction is then below the threshold value that is decisive for the transfer belt. This configuration can increase reliability during operation of the sealing device 100.

Basically, the determination of the speed profiles in step 242 and in step 243 can be done such that first of all speed profiles are created for both the transfer belt 130 and the transport belt 120, each of which would already be suitable for carrying out the entire correction of the distance. It is then checked to what extent these speed profiles deviate from or exceed the threshold value. The speed profiles can then be iteratively newly determined, for example based on the speed profile thus determined for the transport belt 120 in step 242 or for the speed profile thus determined in 243 in step 244, until no more threshold value is exceeded. Alternatively, as already mentioned above, the necessary distance correction can also be distributed equally to each of the belts, i.e., to the transport belt 120 and the transfer belt 130.

Once the speed profiles are determined, both the transport belt 120 and the transfer belt 130 are then controlled accordingly in step 250 to correct for the distance between successive packages 190.

In this context, it can again be provided that the transport belt 120 and the transfer belt 130 each have the same speed at least during the transfer of a package. Acceleration or deceleration therefore preferably takes place when the leading package of the pair of subsequent packages 190 has been transferred from the transport belt 120 to the transfer belt 130 and before the subsequent package is transferred from the transport belt to the transfer belt. Similarly, it can be provided that the transport belt 120 is also preferably accelerated only when it has taken over the leading package 190 of the pair of successive packages 190 from the feeding device 110 and before it takes over the trailing package 190 from the feeding device again at a speed which is equal to the transport speed of the packages 190 in the feeding device.

What is claimed is:

1. A sealing device for sealing packages, the sealing device comprising:
   a sealing station with a plurality of receptacles for packages;
   a transfer belt arranged upstream of the sealing station for transferring packages to the sealing station;
   a transport belt arranged upstream of the transfer belt for transporting and transferring packages to the transfer belt; and
   a feeding device for feeding packages to the transport belt,
   wherein the transport belt and the transfer belt can be driven independently of one another,
   wherein the sealing device comprises at least one sensor, which is adapted to determine a distance between successively transported packages in the feeding device, and a control unit, wherein the control unit is adapted to determine a speed profile of the transport belt and a speed profile of the transfer belt based on a distance of successively transported packages measured by the sensor, and to control the transport belt and the transfer belt as a function of the speed profile so that the distance of successive packages during a transfer to the sealing station corresponds to the distance of adjacent receptacles for packages.

2. The sealing device according to claim 1, wherein the sealing device comprises a second sensor which is adapted to determine a distance of successively transported packages in the transport belt, wherein the control unit is adapted to determine a speed profile of the transfer belt depending on the distance measured by the sensor and on the distance measured by the second sensor and to control the transfer belt as a function of the speed profile.

3. The sealing device according to claim 2, wherein the control unit is adapted to determine, depending on the distance of successively transported packages in the feeding device measured by the sensor, whether a speed profile determined for the transfer belt exceeds a threshold value for the movement of the transfer belt at constant speed of the transport belt.

4. The sealing device according to claim 3, wherein the control unit is adapted to determine the speed profiles of the transport belt and the transfer belt depending on the distance of successively transported packages in the feeding device measured by the sensor such that the threshold value of the movement of the transfer belt is not exceeded.

5. The sealing device according to claim 3, wherein the threshold value indicates a maximum deceleration and/or a maximum acceleration of the transfer belt.

6. The sealing device according to claim 1, wherein the speed profile of the transport belt and/or the speed profile of the transfer belt comprises one or more parameters concerning an acceleration, a deceleration, an acceleration duration, a deceleration duration, a transport speed, a duration for which the transport speed is maintained.

7. The sealing device according to claim 1, wherein the control unit is adapted to control the movement of the transfer belt and the transport belt based on the speed profiles such that the transport belt and the transfer belt move at the same speed at least when a package is transferred from the transport belt to the transfer belt.

8. The sealing device according to claim 1, wherein the sensor and/or the second sensor is or comprises a light barrier.

9. A method for controlling the transport of packages in a sealing device, wherein the sealing device comprises a sealing station with a plurality of receptacles for packages, a transfer belt arranged upstream of the sealing station, which transfers packages to the sealing station, a transport belt arranged upstream of the transfer belt, which transports packages and transfers them to the transfer belt, and a feeding device, which feeds packages to the transport belt, wherein the transport belt and the transfer belt can be driven independently of one another, and wherein the sealing device comprises at least one sensor, which determines a distance between successively transported packages in the feeding device, and a control unit, wherein the method comprises that the control unit determines a speed profile of the transport belt and a speed profile of the transfer belt based on a distance of successively transported packages measured by the sensor and controls the transport belt and the transfer belt as a function of the speed profile such that the distance of successive packages during a transfer to the sealing station corresponds to the distance of adjacent receptacles for packages.

10. The method according to claim 9, wherein the sealing device comprises a second sensor which determines a distance of successively transported packages in the transport belt, wherein the control unit determines a speed profile of the transfer belt depending on the distance measured by the sensor and on the distance measured by the second sensor and controls the transfer belt as a function of the speed profile.

11. The method according to claim 10, wherein the control unit determines, depending on the distance of successively transported packages in the feeding device measured by the sensor, whether a speed profile determined for the transfer belt exceeds a threshold value for the movement of the transfer belt at constant speed of the transport belt.

12. The method according to claim 11, wherein the control unit determines the speed profiles of the transport belt and the transfer belt depending on the distance of successively transported packages in the feeding device measured by the sensor such that the threshold value of the movement of the transfer belt is not exceeded.

13. The method according to claim 11, wherein the threshold value indicates a maximum deceleration and/or a maximum acceleration of the transfer belt.

14. The method according to claim 9, wherein the speed profile of the transport belt and/or the speed profile of the transfer belt comprises one or more parameters concerning an acceleration, a deceleration, an acceleration duration, a deceleration duration, a transport speed, a duration for which the transport speed is maintained.

15. The method according to claim 9, wherein the control unit controls the movement of the transfer belt and the transport belt based on the speed profiles such that the transport belt and the transfer belt move at the same speed at least when a package is transferred from the transport belt to the transfer belt.

16. A sealing device for sealing packages, the sealing device comprising:
   a sealing station with a plurality of receptacles for packages;
   a transfer belt upstream of the sealing station to transfer packages to the sealing station;
   a transport belt upstream of the transfer belt to transport and transfer packages to the transfer belt; and
   a feeder to feed packages to the transport belt,
   wherein the transport belt and the transfer belt are capable of being driven independently of one another,
   wherein the sealing device comprises a sensor to determine a distance between successively transported packages in the feeding device, and a controller to determine a speed profile of the transport belt and a speed profile of the transfer belt based on a distance of successively transported packages measured by the sensor, and to control the transport belt and the transfer belt as a function of the speed profile so that the distance of successive packages during a transfer to the sealing station corresponds to the distance of adjacent receptacles for packages.

17. The sealing device according to claim 16, wherein the controller can adjust the distance of successive packages during a transfer to the sealing station using the speed profiles so that it corresponds to the distance of adjacent receptacles for packages.

18. The sealing device according to claim 16, wherein the sealing device comprises a second sensor to determine a distance of successively transported packages in the transport belt, wherein the controller is adapted to determine a speed profile of the transfer belt depending on the distance measured by the sensor and on the distance measured by the second sensor and to control the transfer belt as a function of the speed profile.

19. The sealing device according to claim 18, wherein the controller is adapted to determine, depending on the distance of successively transported packages in the feeder measured by the sensor, whether a speed profile determined for the transfer belt exceeds a threshold value for the movement of the transfer belt at constant speed of the transport belt, and wherein the controller is adapted to determine the speed profiles of the transport belt and the transfer belt depending on the distance of successively transported packages in the feeder measured by the sensor such that the threshold value of the movement of the transfer belt is not exceeded.

* * * * *